United States Patent [19]
Ishino et al.

[11] Patent Number: 5,529,546
[45] Date of Patent: Jun. 25, 1996

[54] FORWARD/REVERSE DRIVE AND STOP CONTROL SYSTEM FOR HYDROSTATIC-MECHANICAL TRANSMISSIONS

[75] Inventors: Tsutomu Ishino, Osaka; Ryoichi Maruyama, Kanagawa; Akinobu Takada; Keita Mutō, both of Osaka, all of Japan

[73] Assignee: Kabushkik Kaisha Komatsu Seisakusho, Tokyo, Japan

[21] Appl. No.: 392,543

[22] Filed: Feb. 21, 1995

[30]  Foreign Application Priority Data

Feb. 18, 1994 [JP] Japan .................................. 6-021574

[51] Int. Cl.⁶ ........................................................ F16H 47/04
[52] U.S. Cl. ............................ 475/76; 475/81; 477/68
[58] Field of Search .................................. 475/76, 78, 79, 475/81; 60/433; 477/68

[56]  References Cited

U.S. PATENT DOCUMENTS

| | | | |
|---|---|---|---|
| 4,341,131 | 7/1982 | Pollman | 475/81 |
| 4,382,392 | 5/1983 | Meyerle et al. | 475/81 |
| 4,754,664 | 7/1988 | Dick | 475/81 |
| 4,776,233 | 10/1988 | Kita et al. | 475/76 |
| 5,193,416 | 3/1993 | Kanayama | 477/68 X |
| 5,406,793 | 4/1995 | Maruyama et al. | 60/431 |
| 5,419,128 | 5/1995 | Asano et al. | 60/433 X |

FOREIGN PATENT DOCUMENTS 62-31660   7/1987   Japan .
4-191558   7/1992   Japan .

*Primary Examiner*—Charles A. Marmor
*Assistant Examiner*—Peter Kwon
*Attorney, Agent, or Firm*—Armstrong, Westerman, Hattori, McLeland & Naughton

[57]   ABSTRACT

A control system in which a judgment is made such that (i) a vehicle is in a forward drive control state, on condition that the forward/reverse drive lever is placed in the forward drive position and the actual speed ratio exceeds a specified small value in a forward drive direction, (ii) the vehicle is in a reverse drive control state on condition that the lever is placed in the reverse drive position and the actual speed ratio exceeds a specified small value in a reverse drive direction, (iii) the vehicle is in an engine brake control state, on condition that the lever is placed in the neutral position and the actual speed ratio exceeds the specified small value in the forward or reverse drive direction, (iv) the vehicle is in an FR shift control state, on condition that the lever is placed in the forward or reverse drive position and the actual speed ratio exceeds the specified small value in the reverse or forward drive direction, and (v) the vehicle is in a neutral control state, on condition that the lever is placed in the neutral position and the actual speed ratio does not exceed the specified small values in the forward and reverse drive directions.

7 Claims, 12 Drawing Sheets

FORWARD/REVERSE DRIVE AND STOP CONTROL SYSTEM FOR HYDROSTATIC-MECHANICAL TRANSMISSIONS

BACKGROUND OF THE INVENTION (1) Field of the Invention

The invention relates to a forward/reverse drive and stop control system for hydrostatic-mechanical transmissions, that is suited for use in tracklaying vehicles such as bulldozers, and more particularly, to a technique for controlling the forward drive, reverse drive and stoppage of such vehicles according to the position of the forward/reverse drive lever.

(2) Description of the Prior Art

One of such control systems for hydrostatic-mechanical transmissions is disclosed in Japanese Patent Publication No. 62-31660 (1987). According to the system taught by this publication, the angle of a swash plate for controlling the discharge of a pump in the hydrostatic transmission unit is adjusted according to the difference between a target engine revolution speed calculated from a throttle position and an actual engine revolution speed such that the actual engine revolution speed is made close to the target engine revolution speed.

SUMMARY OF THE INVENTION

The prior art control system described above, however, exhibits poor response because of its feedback control in which the difference between actual and target engine revolution speeds is used to obtain an amount that adjusts the swash plate for controlling the discharge of a pump in the hydrostatic transmission unit. In order to solve this problem, we have proposed a control system in Japanese Patent Application No. 2-323930 (1990) (now published as Japanese Patent Publication Laid Open No. 4-191558 (1992)). In this system, a target motor speed ratio (i.e., a target value for the ratio of the revolution speed of the motor in the hydrostatic transmission unit to the revolution speed of the power source) is first computed and then the angle of the discharge controlling swash plate for the pump in the hydrostatic transmission unit is adjusted by feed forward control using the target motor speed ratio.

Generally, it is necessary in a vehicle incorporating an automatic transmission to accurately control the forward drive, reverse drive, start and stoppage of the vehicle according to the position of the forward/reverse drive lever operated by the operator. As the hydrostatic-mechanical transmission disclosed in the above publication (Japanese Patent Publication Laid Open No. 4-191558 (1992)) has a construction basically different from that of, for example, a transmission equipped with a hydraulic torque convertor, the conventional forward/reverse drive and stop control method cannot be applied to the vehicle incorporating the hydrostatic-mechanical transmission.

The present invention has been made in view of the above problem and one of the objects of the invention is therefore to provide a system for accurately controlling the forward drive, reverse drive and stoppage of a vehicle provided with a hydrostatic-mechanical transmission, in accordance with lever operation performed by the operator. The foregoing object can be achieved by a system according to the invention, in which how the vehicle should be driven (i.e., the control state of the vehicle) is judged from the position of the forward/reverse drive lever and the driving condition of the vehicle, and the vehicle is then controlled according to the vehicle control state. More specifically, according to the invention, there is provided a forward/reverse drive and stop control system for a hydrostatic-mechanical transmission which is equipped with a mechanical transmission unit actuated through an input shaft connectable to a power source; a hydrostatic transmission unit which is connectable to the input shaft and comprises a pump and motor having their respective discharge controlling swash plates, the angle of at least either of the swash plates being variable; and a differential unit for actuating both the mechanical transmission unit and the hydrostatic transmission unit by connecting an output shaft thereto, the control system comprising, as shown in FIG. 1 which illustrates the principle of the invention, (a) speed ratio detecting means (1) for detecting an actual speed ratio that is the ratio of the revolution speed of said output shaft to the revolution speed of said power source;

(b) lever position detecting means (2) for determining which of forward drive position, neutral position and reverse drive position a forward/reverse drive lever is placed in; and (c) vehicle control state judging means (3) for making a judgment based on the detections performed by the speed ratio detecting means (1) and the lever position detecting means (2), such that (i) a vehicle is in a forward drive control state in which the vehicle is required to be forwardly driven, on condition that the forward/reverse drive lever is placed in the forward drive position and the actual speed ratio exceeds a specified small value in a forward drive direction, (ii) the vehicle is in a reverse drive control state in which the vehicle is required to be reversely driven, on condition that the forward/reverse drive lever is placed in the reverse drive position and the actual speed ratio exceeds a specified small value in a reverse drive direction, (iii) the vehicle is in an engine brake control state in which the vehicle is required to be gradually stopped, on condition that the forward/reverse drive lever is placed in the neutral position and the actual speed ratio exceeds the specified small value in the forward drive direction or the specified small value in the reverse drive direction, (iv) the vehicle is in an FR shift control state in which the vehicle is required to be once immediately stopped and then driven in an opposite direction, on condition that the forward/reverse drive lever is placed in the forward drive position or reverse drive position and the actual speed ratio exceeds the specified small value in the reverse drive direction or the specified small value in the forward drive direction, and (v) the vehicle is in a neutral control state in which the vehicle is required to be completely stopped, on condition that the forward/reverse drive lever is placed in the neutral position and the actual speed ratio does not exceed the specified small values in the forward drive direction and reverse drive direction. In the control system having the above construction, according to the actual speed ratio (i.e., the ratio of the revolution speed of the output shaft to the revolution speed of the power source) detected by the speed ratio detecting means (1) and the position of the forward/reverse drive lever detected by the lever position detecting means (2), the vehicle control state judging means (3) judges which of the five states, namely, the forward drive control state, reverse drive control state, engine brake control state, FR shift control state and neutral control state the vehicle is in. The position of the forward/reverse drive lever and the actual speed ratio which correspond to each control state are as follows:

(1) Forward drive control state: the forward/reverse drive lever is placed in the forward drive position and the actual speed ratio exceeds the specified small value in the forward drive direction.

(2) Reverse drive control state: the forward/reverse drive lever is placed in the reverse drive position and the actual speed ratio exceeds the specified small value in the reverse drive direction.

(3) Engine brake control state: the forward/reverse drive lever is placed in the neutral position and the actual speed ratio exceeds the specified small value in the forward direction or the specified small value in the reverse drive direction.

(4) FR shift control state: the forward/reverse drive lever is placed in the forward drive position or reverse drive position and the actual speed ratio exceeds the specified small value in the forward drive direction or the specified small value in the reverse drive direction.

(5) Neutral control state: the forward/reverse drive lever is placed in the neutral position and the actual speed ratio does not exceed the specified small values in the forward drive direction and reverse drive direction.

The control system of the invention further comprises:

(a) target speed ratio computing means (4) for computing a target speed ratio, which is a target value for the ratio of the revolution speed of the output shaft to the revolution speed of the power source, according to the control state of the vehicle judged by the vehicle control state judging means (3);

(b) target motor speed ratio computing means (5) for computing a target motor speed ratio, which is a target value for the ratio of the revolution speed of the motor in the hydrostatic transmission unit to the revolution speed of the power source, from the target speed ratio computed by the target speed ratio computing means (4); and (c) swash plate angle controlling means (6) for controlling the angle of at least either of the discharge controlling swash plates according to the target motor speed ratio computed by the target motor speed ratio computing means (5).

In the control system having these means, a target speed ratio is computed according to the control state of the vehicle and a target motor speed ratio is computed based on the target speed ratio. As the target motor speed ratio corresponds to the volume ratio of the discharge of the motor to the discharge of the pump, the angle of at least either of the discharge controlling swash plates is directly controlled by the swash plate angle controlling means (6) using the target motor speed ratio as a control amount, so that the revolution speed of the power source can be readily adjusted to the target revolution speed. Thus, the forward drive, reverse drive and stop-page of the vehicle can be appropriately carried out in accordance with lever operation performed by the operator.

Preferably, the target speed ratio computing means (4) computes the target speed ratio with a target engine revolution speed fixed at a value more than the revolution speed of the engine in a full-throttle state, when the vehicle control state judging means (3) judges that the vehicle is in the engine brake control state. This arrangement makes it possible to gradually reduce the value of the target speed ratio, thereby gradually decelerating the vehicle. In this case, the target speed ratio computing means (4) computes the target speed ratio, limiting the difference between the actual revolution speed of the engine and a target revolution speed for the engine according to a speed range in which the mechanical transmission unit is presently placed. With this arrangement, the degree of the deceleration can be limited according to the present speed range, so that more smooth, natural stoppage can be ensured.

Preferably, the target speed ratio computing means (4) computes the target speed ratio such that it decreases a certain value at a time, when the vehicle control state judging means (3) judges that the vehicle is in the FR shift control state. With this arrangement, the vehicle can be immediately stopped by selecting an appropriate value as the certain value.

Further, it is preferable that the target speed ratio computing means (4) fixes the target speed ratio at zero, when the vehicle control state judging means (3) judges that the vehicle is in the neutral control state. This enables it to stop the vehicle without fail.

In this case, the target speed ratio computed by the target speed ratio computing means (4) is limited within a specified range which is set for every speed range for the mechanical transmission unit, using the characteristic function of the target motor speed ratio against the target speed ratio.

Other objects of the present invention will become apparent from the detailed description given hereinafter. However, it should be understood that the detailed description and specific examples, while indicating a preferred embodiment of the invention, is given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and accompanying drawings which are given by way of illustration only, and thus are not limitative of the present invention, and wherein:

FIG. 1 is a diagram showing the principle of the invention;

FIG. 2 is a diagram showing the structure of the hydrostatic-mechanical transmission according to one embodiment of the invention;

FIG. 3 is a graph of actual motor speed ratio verses actual speed ratio;

FIG. 4 is a flow chart of engine revolution speed control;

FIG. 5 is a diagram illustrating the control states of a vehicle;

FIG. 6 is a flow chart of vehicle control state judgment;

FIG. 7 is a flow chart of engine brake control;

FIG. 8 is a flow chart of FR shift control;

FIG. 9 is a flow chart of neutral control;

FIG. 10 is a graph of target motor speed ratio verses target speed ratio; and

FIG. 11 is a flow chart of target speed ratio limitation in accordance with speed range.

DESCRIPTION OF THE PREFERRED EMBODIMENT

Now, reference will be made to the accompanying drawings for describing a preferred embodiment of a forward/reverse drive and stop control system for a hydrostatic-mechanical transmission according to the invention.

Figure 1:
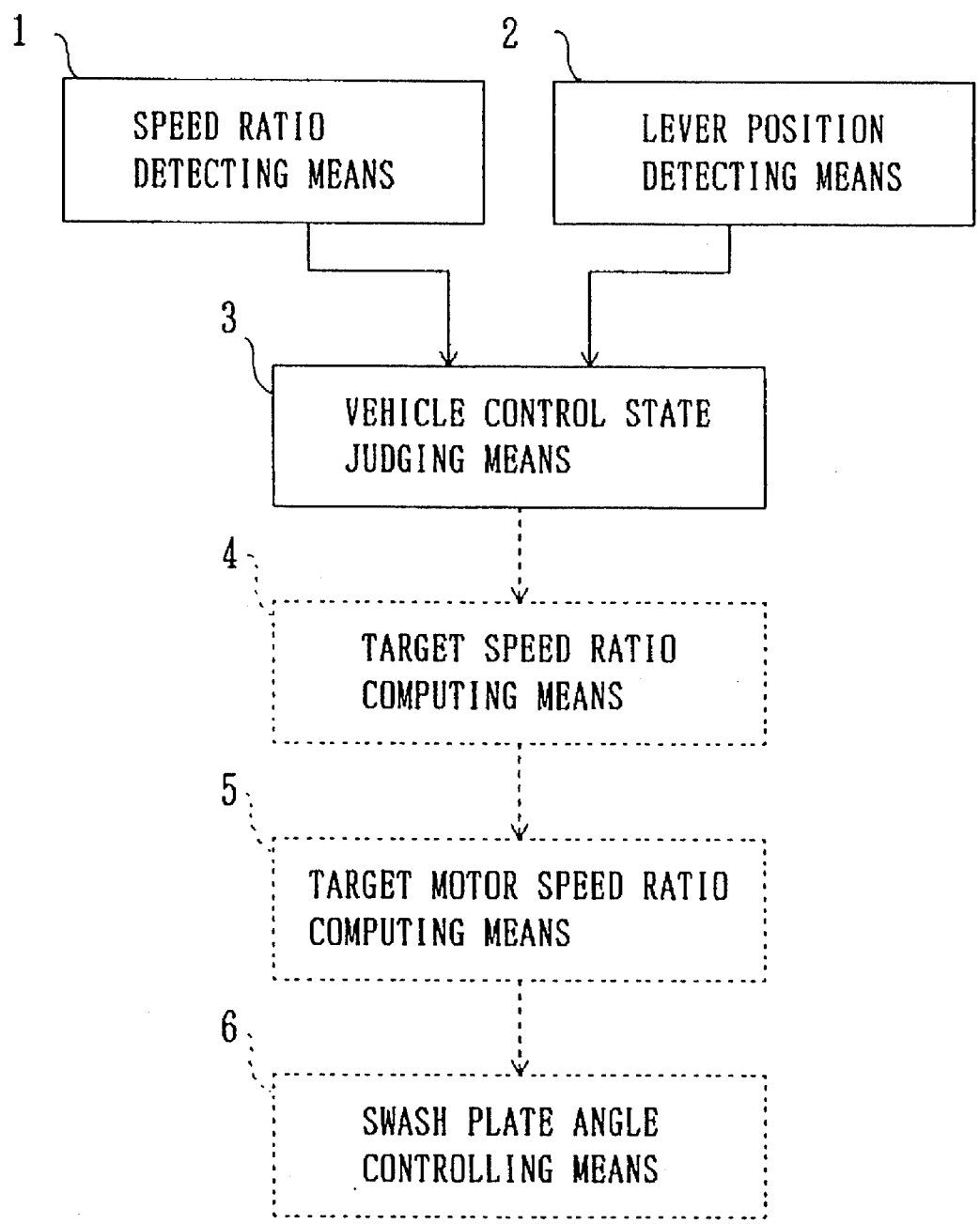
FIGS. 1 to 11 provide illustrations of a forward/reverse drive and stop control system for a hydrostatic-mechanical transmission according to a preferred embodiment of the invention.
Figure 2:
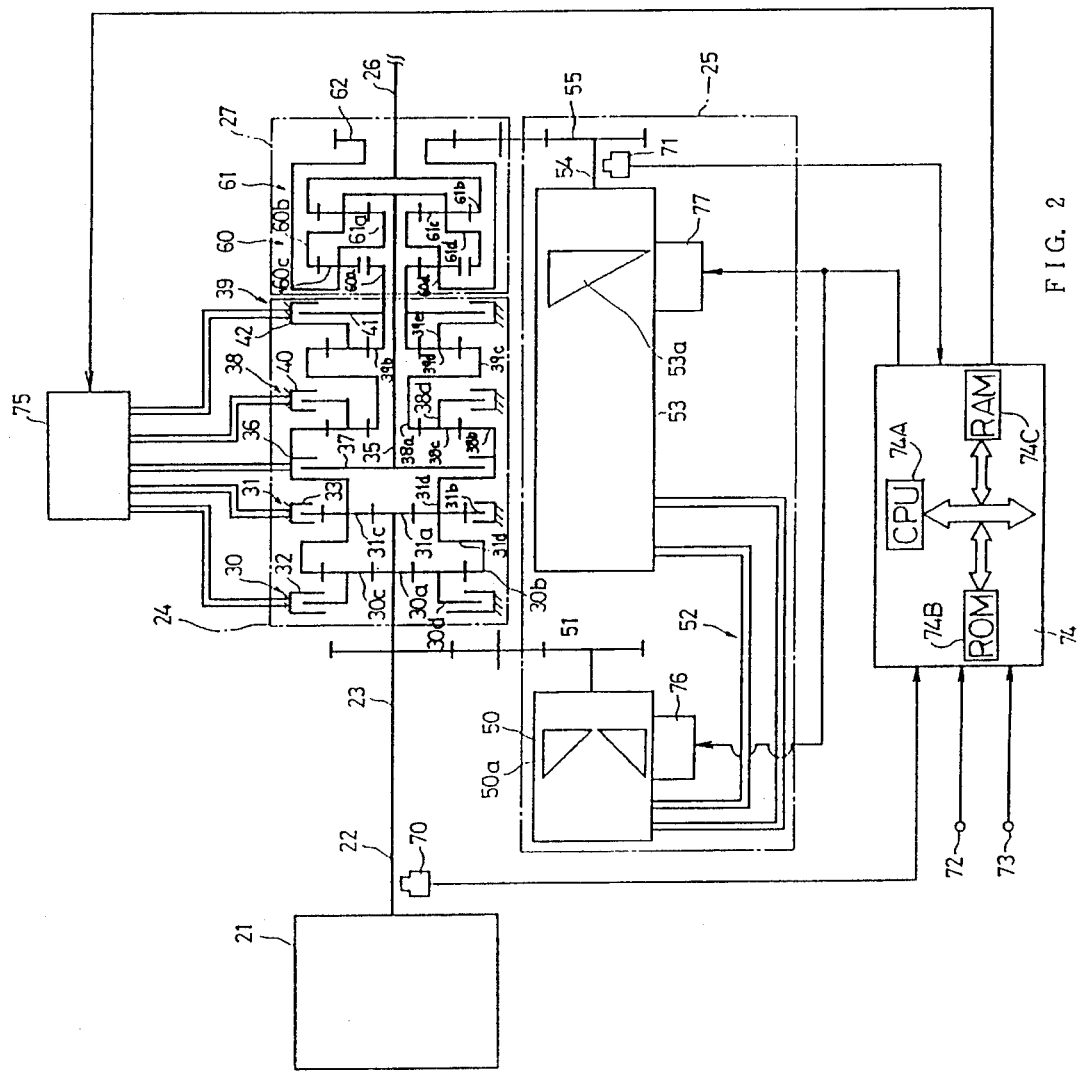
Figure 3:
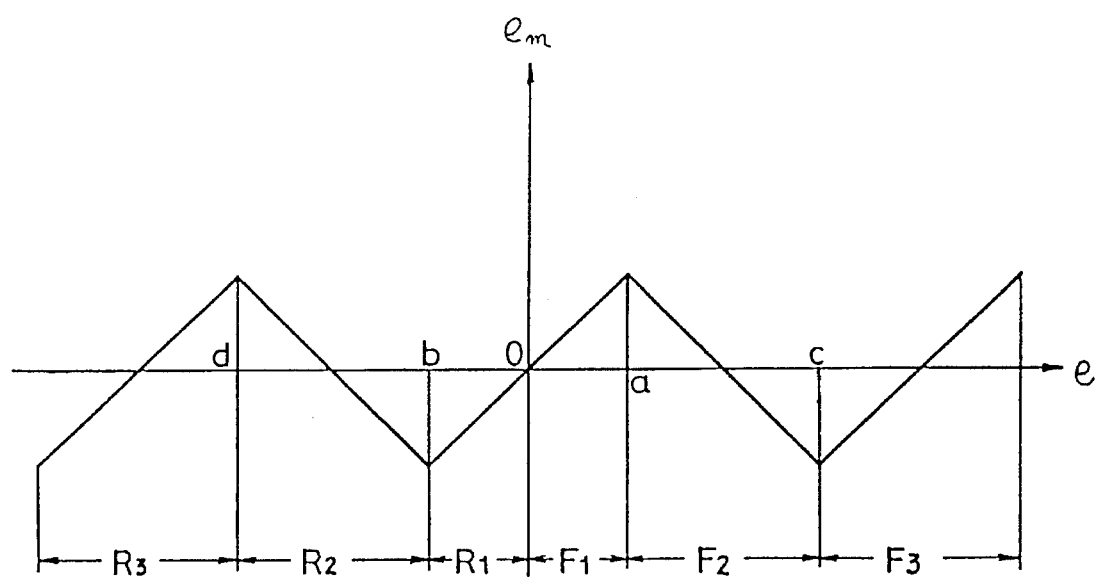

In FIG. 2, there are provided a mechanical transmission unit 24 which includes a gear box for providing three forward speeds and three reverse speeds and a hydrostatic transmission unit 25 having a hydraulic pump-motor. These units 24 and 25 are connected to an input shaft 23 in such a manner that power transmitted from an engine 21 can be split, and the input shaft 23 is coaxially connected to an output shaft 22 of the engine 21 which is employed as one example of the power source of the invention. There is also provided a differential unit 27 that selectively connects an output shaft 26 to both the mechanical transmission unit 24 and the hydrostatic transmission unit 25, or to the hydrostatic transmission unit 25 only, for driving.

The mechanical transmission unit 24, hydrostatic transmission unit 25 and differential unit 27 will be hereinafter described in that order.

(1) Mechanical transmission unit 24

Referring to FIG. 2, the input shaft 23 is provided with a reverse planetary gear train 30 and a forward planetary gear train 31. The gear trains 30 and 31 are of the single planetary type and are aligned in an axial direction of the input shaft 23 in this order when enumerating from the left. The reverse planetary gear train 30 is composed of a sun gear 30a fixedly attached to the input shaft 23; a ring gear 30b positioned outside the sun gear 30a; a planet gear 30c that is in mesh with the gears 30a and 30b, being positioned therebetween; and a planet carrier 30d that is for the planet gear 30c and can be hydraulically braked by a reverse hydraulic clutch 32. Similarly, the forward planetary gear train 31 is composed of a sun gear 31a fixedly attached to the input shaft 23; a ring gear 31b that is positioned outside the sun gear 31a and can be hydraulically braked by a forward hydraulic clutch 33; a planet gear 31c that is in mesh with the gears 31a and 31b, being positioned therebetween; and a planet carrier 31d that is for the planet gear 31c and is integral with the ring gear 30b of the reverse planetary gear train 30.

There is provided an intermediate shaft 35 positioned coaxially with and in an extending direction of the input shaft 23. In FIG. 2, the intermediate shaft 35 is provided, at the left end thereof, with a clutch plate 37 that is hydraulically connectable by a 2nd-speed hydraulic clutch 36. The 2nd-speed hydraulic clutch 36 is formed integrally with the planet carrier 31d of the forward planetary gear train 31. The intermediate shaft 35 is also provided with a first 3rd-speed planetary gear train 38 and a second 3rd-speed planetary gear train 39. The gear trains 38 and 39 are of the single planetary type and are aligned in an axial direction of the intermediate shaft 35 in this order when enumerating from the left of FIG. 2.

The first 3rd-speed planetary gear train 38 is composed of a sun gear 38a rotatably supported by the intermediate shaft 35; a ring gear 38b that is positioned outside the sun gear 38a, being integral with the planet carrier 31d of the forward planetary gear train 31 and the 2nd-speed hydraulic clutch 36; a planet gear 38c that is in mesh with the gears 38a and 38b, being positioned therebetween; and a planet carrier 38d that is for the planet gear 38c and can be hydraulically braked by a 3rd-speed hydraulic clutch 40. Similarly, the second 3rd-speed planetary gear train 39 is composed of a sun gear 39b that is rotatably supported by the intermediate shaft 35, being integral with a clutch plate 41; a ring gear 39c that is positioned outside the sun gear 39b, being integral with the sun gear 38a of the first 3rd-speed planetary gear train 38; a planet gear 39d that is in mesh with the gears 39b and 39c, being positioned therebetween; and a fixed planet carrier 39e that is for the planet gear 39d and is integral with a 1st-speed hydraulic clutch 42 for hydraulically connecting the clutch plate 41.

(2) Hydrostatic transmission unit 25

The input shaft 23 is coupled through a gear train 51 to a variable displacement pump 50 having a discharge controlling variable-angle swash plate 50a which can be inclined both in the positive and negative directions. The variable displacement pump 50 is connected, through a pair of conduits 52 consisting of an outgoing path and a return path, to a variable displacement motor 53 having a discharge controlling variable-angle swash plate 53a which can be inclined in one direction. The variable displacement motor 53 has an output shaft 54 connected to a gear train 55. The discharge controlling variable-angle swash plates 50a and 53a provided in the variable displacement pump 50 and the variable displacement motor 53 are designed such that the revolution speed of the variable displacement pump 50 and that of the variable displacement motor 53 vary according to variations in the angles of the discharge controlling variable-angle swash plates 50a and 53a, as described bellow.

The revolution speed of the variable displacement pump 50 is specified, and the discharge controlling variable-angle swash plate 53a of the variable displacement motor 53 is inclined at a maximum tilt angle. In the above condition, as the tilt angle of the discharge controlling variable-angle swash plate 50a of the variable displacement pump 50 is inclined from zero in the positive direction, the revolution speed of the variable displacement motor 53 increases from zero in the positive direction. Then, the tilt angle of the discharge controlling variable-angle swash plate 50a of the variable displacement pump 50 is set to a maximum positive value. In this condition, as the tilt angle of the discharge controlling variable-angle swash plate 53a of the variable displacement motor 53 is decreased, the revolution speed of the variable displacement motor 53 further increases in the positive direction.

On the other hand, as the tilt angle of the discharge controlling variable-angle swash plate 50a of the variable displacement pump 50 is inclined from zero in the negative direction with the discharge controlling variable-angle swash plate 53a of the variable displacement motor 53 being inclined at a maximum tilt angle, the revolution speed of the variable displacement motor 53 decreases from zero in the negative direction. Then, the tilt angle of the discharge controlling variable-angle swash plate 50a of the variable displacement pump 50 is set to a maximum negative value. In this condition, as the tilt angle of the discharge controlling variable-angle swash plate 53a of the variable displacement motor 53 is decreased, the revolution speed of the variable displacement motor 53 further decreases in the negative direction.

(3) Differential unit 27

Referring to FIG. 2, the intermediate shaft 35 is provided, at the right end thereof, with a first differential planetary gear train 60 of the double planetary type and a second differential planetary gear train 61 of the single planetary type. These gear trains 60 and 61 are aligned coaxially with and in an extending direction of the intermediate shaft 35 in this order when enumerating from the left. The first differential planetary gear train 60 is composed of a sun gear 60a that is rotatably supported by the intermediate shaft 35, being integral with the sun gear 39b of the second 3rd-speed planetary gear train 39 and the clutch plate 41; a ring gear 60b positioned outside the sun gear 60a; a planet gear 60c that is in mesh with either of the gears 60a and 60b, being positioned therebetween; and a planet carrier 60d that is for the planet gear 60c and is integral with an input gear 62 connected through the gear train 55 to the output shaft 54 of the variable displacement motor 53 in the hydrostatic transmission unit 25. Similarly, the second differential planetary gear train 61 is composed of a sun gear 61a that is rotatably supported by the intermediate shaft 35, being integral with the planet carrier 60d of the first differential planetary gear train 60; a ring gear 61b that is positioned outside the sun gear 61a, being integral with the output shaft 26 positioned (at the right hand in FIG. 2) coaxially with and in an extending direction of the intermediate shaft 35; a planet gear 61c that is in mesh with the gears 61a and 61b, being positioned therebetween; and a planet carrier 61d that is for the planet gear 61c and is integral with the ring gear 60b of the first differential planetary gear train 60 and the intermediate shaft 35.

Figure 4:
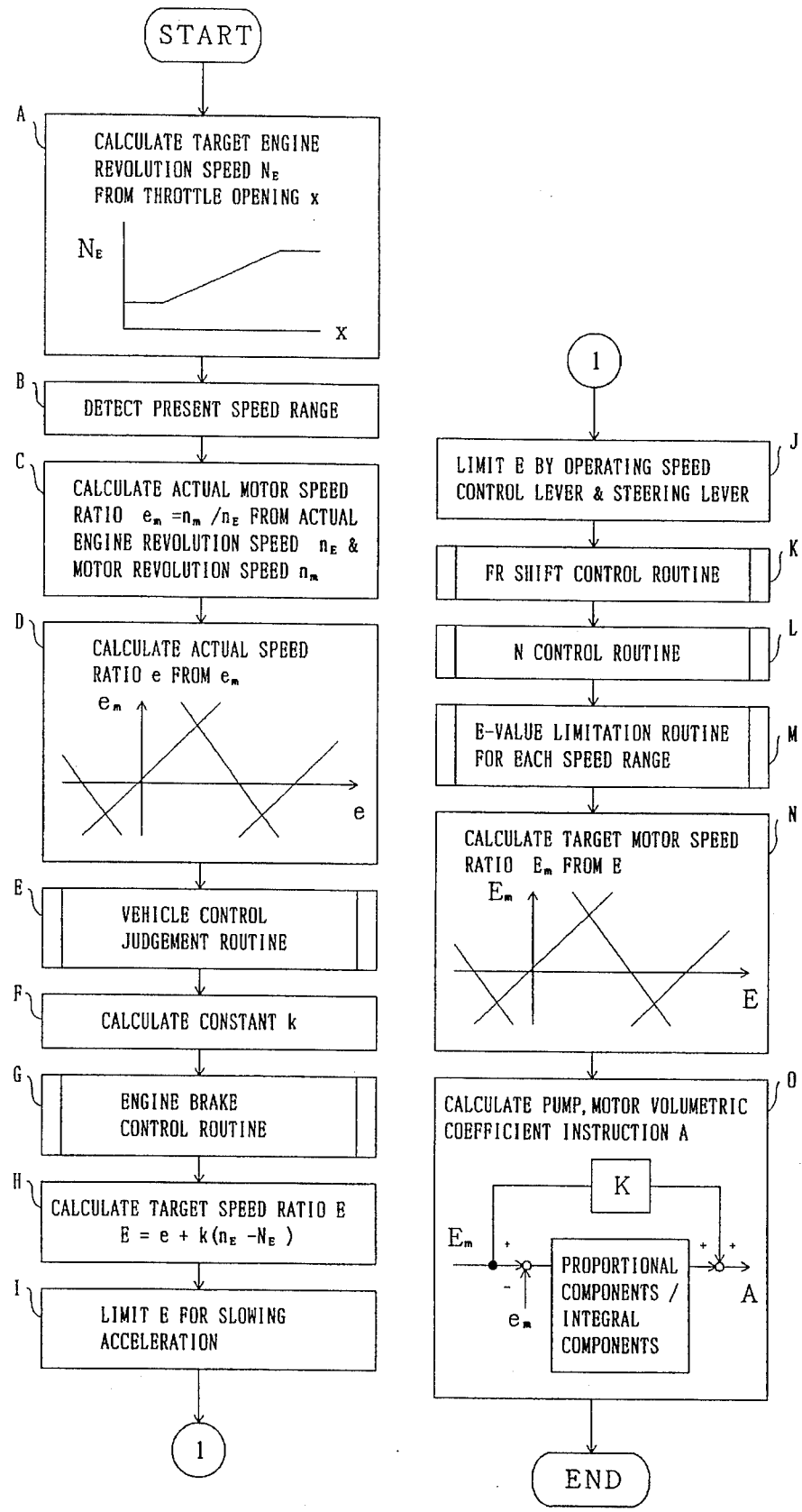

There will be given an explanation on the mechanical operations, of the mechanical transmission unit 24, hydrostatic transmission unit 25 and differential unit 27. FIG. 4 shows the relationship between speed ratio and motor speed ratio in the respective speed ranges (i.e., 1st forward speed (F1); 2nd forward speed (F2); 3rd forward speed (F3); 1st reverse speed (R1); 2nd reverse speed (R2); and 3rd reverse speed (R3)). Note that the above speed ratio is the ratio of the revolution speed of the output shaft 26 to the revolution speed of the output shaft 22 of the engine 21 (=the revolution speed of the engine) and the above motor speed ratio is the ratio of the revolution speed of the output shaft 54 of the variable displacement motor 53 (=the revolution speed of the motor) to the revolution speed of the output shaft 22 of the engine 21 (=the revolution speed of the engine).

(i) 1st forward speed (F1) and 1st reverse speed (R1): Only the 1st-speed hydraulic clutch 42 is engaged. The engagement of the clutch 42 causes the sun gear 60a of the first differential planetary gear train 60 to be hydraulically braked through the: clutch plate 41 and causes the intermediate shaft 35 to be in a freely rotated state. Accordingly, only the torque of the variable displacement hydraulic motor 53 in the hydrostatic transmission unit 25 is transmitted to the output shaft 54 of the variable displacement hydraulic motor 53; the gear train 55; the input gear 62, the planet carrier 60d, the planet gear 60c and the ring gear 60b of the first differential planetary gear train 60, the planet carrier 61d, the planet gear 61c and the ring gear 61b of the second differential gear train 61 in the differential unit 27; and the output shaft 26 in that order. In short, the output shaft 26 is driven, being connected only to the hydrostatic transmission unit 25 by means of the differential unit 27.

As the motor speed ratio is thus increased from zero in the positive direction, the revolution speed of the output shaft 26 increases from zero in the positive direction. On the other hand, as the motor speed ratio decreases from zero in the negative direction, the: revolution speed of the output shaft 26 also decreases from zero in the negative direction. Thus, the speed ratio is infinitely varied both in the positive and negative directions within a specified range.

In 1st forward speed (F1) and 1st reverse speed (R1), the 2nd-speed hydraulic clutch 36 may be engaged, or disengaged. However, when taking into account the case where the vehicle may be shifted to 2nd forward speed (F2) or 2nd reverse speed (R2) by clutch operation, the 2nd-speed hydraulic clutch 36 is preferably engaged.

In 1st speed, when the revolution speed of the output shaft 26 increases in the positive direction and the speed ratio is a specified positive value a, the relative revolution speed of the forward hydraulic clutch 33 in relation to the ring gear 31b of the forward planetary gear train 31 becomes zero. In this condition, if the forward hydraulic clutch 33 is engaged and the 1st-speed hydraulic clutch 42 is disengaged, 2nd forward speed (F2) will be obtained. At that time, the 2nd-speed hydraulic clutch 36 is engaged.

In 1st speed, when the revolution speed of the output shaft 26 decreases in the negative direction and the speed ratio is a specified negative value b, the relative revolution speed of the reverse hydraulic clutch 32 in relation to the planet carrier 30d of the reverse planetary gear train 30 becomes zero. In this condition, if the reverse hydraulic clutch 32 is engaged and the 1st-speed hydraulic clutch 42 is disengaged like the above case, 2nd reverse speed (R2) will be obtained. At that time, the 2nd-speed hydraulic clutch 36 is engaged.

(ii) 2nd forward speed (F2)

Since the clutch plate 37 is hydraulically connected by the engagement of the 2nd-speed hydraulic clutch 36 and the ring gear 31b of the forward planetary gear train 31 is hydraulically braked by the engagement of the forward hydraulic clutch 33, the torque of the input shaft 23 is transmitted to the forward planetary gear train 31, the 2nd-speed hydraulic clutch 36 and the intermediate shaft 35 in the mechanical transmission unit 24, and then to the second differential planetary gear train 61 in the differential unit 27. During the transmission, the revolution speed is reduced. The torque of the variable displacement motor 53 in the hydrostatic transmission unit 25 is also transmitted to the output shaft 54 of the variable displacement motor 53, the gear train 55, the input gear 62, the planet carrier 60d of the first differential planetary gear train 60 and then to the second differential planetary gear train 61 in the differential unit 27, while the revolution speed being reduced. The second differential planetary gear train 61 connects the mechanical transmission unit 24 and the hydrostatic transmission unit 25, whereby their revolution speeds are combined to drive the output shaft 26.

Thus, the motor speed ratio decreases thereby increasing the revolution speed of the output shaft 26 in the positive direction. When the motor speed ratio is positive in 2nd forward speed (F2), part of torque from the second differential planetary gear train 61 in the differential unit 27 flows backwardly to the input gear 62 through the planet gear 61c and the sun gear 61a of the second differential planetary gear train 61 and the first differential planetary gear train 60 so that the variable displacement motor 53 performs its pumping operation. The pumping operation of the variable displacement motor 53 causes the variable displacement pump 50 to be driven, and the torque of the variable displacement pump 50 is transmitted through the gear train 51 to the input shaft 23 where the torque is combined with the torque of the engine 21. When the motor speed ratio is negative on the other hand, part of the torque of the input shaft 23 drives the variable displacement pump 50 through the gear train 51. The actuation of the variable displacement pump 50 actuates the variable displacement motor 53 whose torque is transmitted to the gear train 55, the input gear 62 etc. in the differential unit 27, and then to the second differential planetary gear train 61 in the differential unit 27. At the second differential planetary gear train 61, the transmitted torque is combined with torque from the mechanical transmission unit 24 to drive the output shaft 26.

In 2nd forward speed (F2), when the speed ratio is increased to a specified value c, the relative revolution speed of the 3rd-speed hydraulic clutch 40 in relation to the planet carrier 38*d* of the first 3rd-speed planetary gear train 38 becomes zero. In this condition, if the 3rd-speed hydraulic clutch 40 is engaged and the 2nd-speed hydraulic clutch 36 is disengaged, 3rd forward speed (F3) will be obtained.

In 2nd forward speed (F2), when the speed ratio decreases from a higher value to the specified value a, the relative revolution speed of the 1st-speed hydraulic clutch 42 in relation to the clutch plate 41 becomes zero. In this condition, if the 1st-speed hydraulic clutch 42 is engaged and the forward hydraulic clutch 33 is disengaged, 1st forward speed (F1) will be obtained.

(iii) 3rd forward speed (F3)

Since the planet carrier 38*d* of the first 3rd-speed planetary gear train 38 is hydraulically braked by the engagement of the 3rd-speed hydraulic clutch 40 and the ring gear 31*b* of the forward planetary gear train 31 is hydraulically braked by the engagement of the forward hydraulic clutch 33, the torque of the input shaft 23 is transmitted through the forward planetary gear train 31, the 2nd-speed hydraulic clutch 36, the first 3rd-speed planetary gear train 38 and the second 3rd-speed planetary gear train 39 in the mechanical transmission unit 24 to the first and second differential planetary gear trains 60 and 61 in the differential unit 27, whilst the revolution speed being reduced. Also, the torque of the variable displacement motor 53 in the hydrostatic transmission unit 25 is transmitted through the output shaft 54 of the variable displacement motor 53 and the gear train 55 to the first and second differential planetary gear trains 60 and 61 in the differential unit 27, whilst the revolution speed being reduced. The first and second differential planetary gear trains 60 and 61 connect the mechanical transmission unit 24 and the hydrostatic transmission unit 25, whereby their revolution speeds are combined to drive the output shaft 26.

As the motor speed ratio is thus increased, the revolution speed of the output shaft 26 increases in the positive direction.

When the motor speed ratio is negative in 3rd forward speed (F3), part of torque from the first and second differential planetary gear trains 60 and 61 in the differential unit 27 flows backwardly to the input gear 62 so that the variable displacement motor 53 performs its pumping operation and the torque of the variable displacement motor 53 is transmitted, as described above, through the variable displacement pump 50 and the gear train 51 to the input shaft 23 where the transmitted torque is combined with the torque of the engine 21.

When the motor speed ratio is positive on the other hand, part of the torque of the input shaft 23 drives the variable displacement pump 50 through the gear train 51, and the torque of the variable displacement motor 53 is transmitted, as described above, through the, gear train 55 and the input gear 62 etc. in the differential unit 27 to the first and second differential planetary gear trains 60 and 61 in the, differential unit 27. At the first and second differential planetary gear trains 60 and 61, the torque is combined with torque from the., mechanical transmission unit 24 to drive the output shaft 26. In 3rd forward speed (F3), when the speed ratio decreases from a higher value to the specified value c, the relative revolution speed of the 2rd-speed hydraulic clutch 36 in relation to the clutch plate 37 becomes zero. In this condition, if the 2rd-speed hydraulic clutch 36 is engaged and the 3rd-speed hydraulic clutch 40 is disengaged, 2rd forward speed (F2) will be obtained.

(iv) 2rd reverse speed (R2)

Since the clutch plate 37 is hydraulically connected by the engagement of the 2nd-speed hydraulic clutch 36 and the planet carrier 30*d* of the reverse planetary gear train 30 is hydraulically braked by the engagement of the reverse hydraulic clutch 32, the torque of the input shaft 23 is transmitted through the reverse planetary gear train 30, the 2nd-speed hydraulic clutch 36 and the intermediate shaft 35 in the mechanical transmission unit 24 to the second differential planetary gear train 61 in the differential unit 27, whilst the revolution speed being reduced. The torque of the variable displacement motor 53 in the hydrostatic transmission unit 25 is transmitted, as described above, through the output shaft 54 of the output shaft 54 of the variable displacement motor 53, the gear train 55, the input gear 62 and the planet carrier variable displacement motor 53, the gear train 55, the input gear 62 and the planet carrier 60*d* of the first differential planetary gear train 60 in the differential unit 27 to the second differential planetary gear train 61, whilst the revolution speed being reduced. The first differential planetary gear train 61 connects the mechanical transmission unit 24 and the hydrostatic transmission unit 25 thereby combining their revolution speeds to drive the output shaft 26.

As the motor speed ratio is increased accordingly, the revolution speed of the output shaft 26 decreases in the negative direction.

In 2nd reverse speed (R2), when the motor speed ratio is negative, part of torque from the second differential planetary gear train 61 in the differential unit 27 flows backwardly to the hydrostatic transmission unit 25 so that the variable displacement motor 53 performs its pumping operation. When the motor speed ratio is positive, the operation to be carried out is the same as that described in the case of 2nd forward speed (F2), except that a partial flow of the torque of the input shaft 23 toward the hydrostatic transmission unit 25 occurs.

In 2nd reverse speed (R2), when the speed ratio decreases from a higher value to a specified value d, the relative revolution speed of the 3rd-speed hydraulic clutch 40 in relation to the planet carrier 38*d* of the first 3rd-speed planetary gear train 38 becomes zero. In this condition, if the 3rd-speed hydraulic clutch 40 is engaged and the 2nd-speed hydraulic clutch 36 is disengaged, 3rd reverse speed (R3) will be obtained.

When the speed ratio is increased to the specified value b in 2nd reverse speed (R2), the relative revolution speed of the 1st-speed hydraulic clutch 42 in relation to the clutch plate 41 becomes zero. In this condition, if the 1st-speed hydraulic clutch 42 is engaged and the reverse hydraulic clutch 32 is disengaged, 1st reverse speed (R1) will be obtained.

(v) 3rd reverse speed (R3)

Since the planet carrier 38*d* of the first 3rd-speed planetary gear train 38 is hydraulically braked by the engagement of the 3rd-speed hydraulic clutch 40 and the planet carrier 30*d* of the reverse planetary gear train 30 is hydraulically braked by the engagement of the reverse hydraulic clutch 32, the torque of the input shaft 23 is transmitted through the reverse planetary gear train 30, the 2nd-speed hydraulic clutch 36, the first 3rd-speed planetary gear train 38 and the second 3rd-speed planetary gear train 39 in the mechanical transmission unit 24 to the first and second differential planetary gear trains 60 and 61 in the differential unit 27, while the revolution speed being reduced. Also, the torque of the variable displacement motor 53 in the hydrostatic transmission unit 25 is transmitted, as described above, through the output shaft 54 of the variable displacement motor 53 and the gear train 55 to the first and second differential planetary gear trains 60 and 61 in the differential unit 27, while the revolution speed being reduced. The first and second differential planetary gear trains 60 and 61 connect the mechanical transmission unit 24 and the hydrostatic transmission unit 25 thereby combining their revolution speeds to drive the output shaft 26.

As the motor speed ratio is decreased accordingly, the revolution speed of the output shaft 26 decreases in the negative direction.

In 3rd reverse speed (R3), when the motor speed ratio is positive, part of torque from the first and second differential planetary gear trains 60 and 61 in the differential unit 27 flows backwardly to the hydrostatic transmission unit 25 so that the variable displacement motor 53 performs its pumping operation. When the motor speed ratio is negative, the operation to be carried out is the same as that described in the case of 3rd forward speed (F3), except that a partial flow of the torque of the input shaft 23 toward the hydrostatic transmission unit 25 occurs.

In 3rd reverse speed (R3), when the revolution speed ratio is increased to the specified value d, the relative revolution speed of the 2nd-speed hydraulic clutch 36 in relation to the clutch plate 37 becomes zero. In this condition, if the 2nd-speed hydraulic clutch 36 is engaged and the 3rd-speed hydraulic clutch 40 is disengaged, 2nd reverse speed (R2) will be obtained.

The operation for controlling the mechanical transmission unit 24 and the hydrostatic transmission unit 25 will be explained below.

In FIG. 2, the output shaft 22 of the engine 21 is provided with an engine revolution speed detector 70 for detecting the revolution speed of the output shaft 22 to detect the revolution speed $n_E$ of the engine 21, and the output shaft 54 of the variable displacement motor 53 in the hydrostatic transmission unit 25 is provided with a motor revolution speed detector 71 for detecting the revolution speed $n_m$ and revolution direction of the variable displacement motor 53. An engine throttle (not shown) is provided with a throttle position detector 72 for detecting the position X of the engine throttle manipulated. A change lever (not shown) is provided with a lever position detector 73 for detecting the lever position FNR (i.e., forward(F), neutral(N) or reverse(R)) of the change lever manipulated. The engine revolution speed detector 70, motor revolution speed detector 71, throttle position detector 72 and lever position detector 73 issue an engine revolution speed signal, motor revolution speed signal, throttle position signal and lever position signal respectively to a control unit 74. The control unit 74 is composed of a central processing unit (CPU) 74A for executing a specified program, a read only memory (ROM) 74B for storing the specified program and various tables, and a random access memory (RAM) 74C serving as a working memory necessary for executing the specified program. The control unit 74 executes arithmetic processing by executing the specified program in accordance with the engine revolution speed signal, motor revolution speed signal, throttle position signal and lever position signal, and issues a shift control signal to a shift valve 75. In response to the shift control signal, the shift valve 75 executes the above-described engagement/disengagement of the reverse hydraulic clutch 32, forward hydraulic clutch 33, 2nd-speed hydraulic clutch 36, 3rd-speed hydraulic clutch 40 and 1st-speed hydraulic clutch 42. The control unit 74 also supplies an angle control signal to a valve 76 for changing the angle of the discharge controlling variable-angle swash plate 50a of the variable displacement pump 50 and to a valve 77 for changing the angle of the discharge controlling variable-angle swash plate 53a of the variable displacement motor 53, respectively.

A target engine revolution speed $N_E$ for the engine 21 is obtained according to the position X of the engine throttle and a control direction for speed ratio is obtained according to the lever position FNR of the change lever. Hence, speed ratio control is performed in the control unit 74 as shown in Table 1. This control is based on (i) the condition (positive, negative, or zero) of the actual speed ratio e; (ii) the relationship between the actual engine revolution speed $n_E$ that is obtained from the engine revolution speed signal from the engine revolution speed detector 70 and the target engine revolution speed $N_E$ that is obtained from the throttle position signal from the throttle position detector 72; and (iii) the lever position FNR obtained from the lever position signal from the lever position detector 73.

TABLE 1

| Actual Speed Ratio e | Relationship Between actual Engine Revolution Speed $n_E$ And Target Engine Revolution Speed $N_E$ | Lever Position FNR | Speed Ratio Control |
|---|---|---|---|
| ≧0 | $n_E > N_E$ | forward | increase to positive |
| >0 | $n_E < N_E$ | | decrease to zero |
| =0 | $n_E < N_E$ | | maintain at zero |
| ≧0 | $n_E = N_E$ | | maintain constant |
| <0 | $n_E \gtreqless N_E{}^*$ | | increase to zero |
| >0 | $n_E \gtreqless N_E{}^*$ | neutral | decrease to zero |
| =0 | $n_E \gtreqless N_E{}^*$ | | maintain at zero |
| <0 | $n_E \gtreqless N_E{}^*$ | | increase to zero |
| ≦0 | $n_E > N_E$ | reverse | decrease to negative |
| <0 | $n_E < N_E$ | | increase to zero |
| =0 | $n_E < N_E$ | | maintain at zero |
| ≦0 | $n_E = N_E$ | | maintain constant |
| >0 | $n_E \gtreqless N_E{}^*$ | | decrease to zero |

*all situations

With reference to the flow chart of FIG. 4 which shows a basic program, the engine revolution speed control that is performed by controlling speed ratio will be described in detail.

A: According to the throttle position signal from the throttle position detector 72, the target engine revolution speed $N_E$ of the engine 21 for the throttle position X is obtained through arithmetic operation which includes conversion and is performed using a preset characteristic function or table. The characteristic function or table is set based on the characteristic curve of the target engine revolution speed $N_E$ against the throttle position X. This characteristic curve is prepared from the characteristic curve of torque against the revolution speed of the engine 21.

B–D: The speed range presently selected in the mechanical transmission unit 24 which is controlled by the control unit 74 with the, help of the shift valve 75 is detected. From the present actual engine revolution speed $n_E$ indicated by the engine revolution speed signal from the engine revolution detector 70 and the present actual motor revolution speed $n_m$ indicated by the motor revolution speed signal from the motor revolution speed detector 71, an actual motor speed ratio $e_m$ (the ratio of the actual motor revolution speed $n_m$ to the, actual engine revolution speed $n_E$ $(=n_m/n_E)$) is obtained by arithmetic operation. The present, actual speed ratio e is obtained by converting the actual motor speed ratio $e_m$ in accordance with the, present speed range detected, by the use of the preliminarily stored characteristic function $e=f(e_m)$ or table. The characteristic function $e=f(e_m)$ is set in accordance with the characteristic curve (see FIG. 4) of the actual motor speed ratio $e_m$ plotted against the actual speed ratio e.

- E: Vehicle control judgment routine: In this routine, how the vehicle should be controlled is determined from the lever position signal from the lever position detector 73 and the present, actual speed ratio e. The details will be explained later with reference to FIG. 5 and the flow chart of FIG. 6.

- F: The value of a constant k (k represents the response of the transmission to a change in engine revolution and its unit is rpm) is obtained. This constant k is to be substituted in the following equation (1) for obtaining a target speed ratio E which is used for slowing down the response to a change in load during digging operation in order to free the operator from extra blade operation for vehicle speed control.

- G: Engine brake control routine: In this routine, the vehicle is gradually decelerated to stop the vehicle during the engine brake control. The details will be described later with reference to the flow chart of FIG. 7.

- H: The target speed ratio E is obtained by substituting the above target engine revolution speed $N_E$, actual speed ratio e and actual engine revolution speed $n_E$ in the following equation (1).

$$E = e \pm k(n_E - N_E) \quad (1)$$

The sign ± in the equation (1) means that it should be "+" at the time of forward drive and should be "−" at the time of reverse drive.

- I: The rate of change in the target speed ratio E with respect to time is limited. This decreases vehicle acceleration at the primary stage of digging and therefore allows the operator to be free from extra blade operation for vehicle speed control, particularly when digging ground that is too hard to strike into by the blade.

- J: The target speed ratio E is limited by operating the speed control lever. The limitation of the target speed ratio E is carried out in order to reduce the turning radius of the vehicle, for example, when the steering lever is operated excessively beyond a specified displacement range at the time of high-speed vehicle moving.

- K: FR shift control routine: In this routine, the vehicle is immediately stopped during the FR shift control. The details will be described later with reference to the flow chart of FIG. 8.

- L: Neutral (N) control routine: In this routine, the vehicle is securely stopped during the neutral control. The details will be described later with reference to the flow chart of FIG. 9.

- M: E-value limitation routine: Since the target speed ratio E varies depending on speed ranges, the range of the target speed ratio E is limited for each speed range. The details will be described later with reference to the graph of FIG. 10 and the flow chart of FIG. 11.

- N: A target motor speed ratio $E_m$ is obtained by converting the target speed ratio E in accordance with the speed range presently selected by the mechanical transmission unit 24. This conversion is done by the use of a characteristic function $E_m=f(E)$ or table which is a characteristic curve slimier to FIG. 4 and has been preset according to the characteristic curve of the target motor speed ratio $E_m$ plotted against the target speed ratio E.

- O: An operation amount A is obtained from the target motor speed ratio $E_m$ and actual motor speed ratio $e_m$. Concretely, a feed forward amount $KE_m$ (K: feed forward coefficient) which is proportional to the target motor speed ratio $E_m$ is added to the sum of the proportional components and integral components of the difference $(=E_m-e_m)$ between the target motor speed ratio $E_m$ and the actual motor speed ratio $e_m$, whereby the operation amount A is obtained. This operation amount A is released as an angle control signal to the angle changing valves 76 and 77.

Accordingly, the actual motor speed ratio $e_m$ is adjusted to be equal to the target motor speed ratio $E_m$ and the actual speed ratio e is adjusted to be equal to the target speed ratio E, so that the actual engine revolution speed $n_E$ is adjusted to be equal to the target engine revolution speed $N_E$ corresponding to the throttle position X of the engine throttle.

Next, the vehicle control judgment routine (Step E) will be described in detail. In the forward/reverse drive and stop control system for a hydrostatic-mechanical transmission of this embodiment, starting and stoppage of the vehicle is controlled according to the position of the forward/reverse drive lever operated by the operator. When the forward/reverse drive lever is shifted from the neutral (N) position into the forward (F) or reverse (R) position to start the vehicle from a standstill for example, the target speed ratio $E(=e\pm k(n_E-N_E))$ is increased from zero toward the forward or reverse drive direction so that the vehicle starts off (i.e., the forward drive control or reverse drive control). If the operator shifts the forward/reverse drive lever from the forward (F) or reverse (R) position into the neutral (N) position, this lever operation indicates that the operator intends to gradually stop the vehicle, and therefore, the vehicle is controlled to be stopped by means of the engine brake (i.e., the engine brake control). When the vehicle is moving, if the forward/reverse drive lever is shifted into a position for a drive direction opposite to the moving direction of the vehicle, this lever operation indicates that the operator intends to immediately change the moving direction of the vehicle, and therefore the vehicle immediately stops and starts again in the opposite direction (i.e., the FR shift control).

Figure 5:
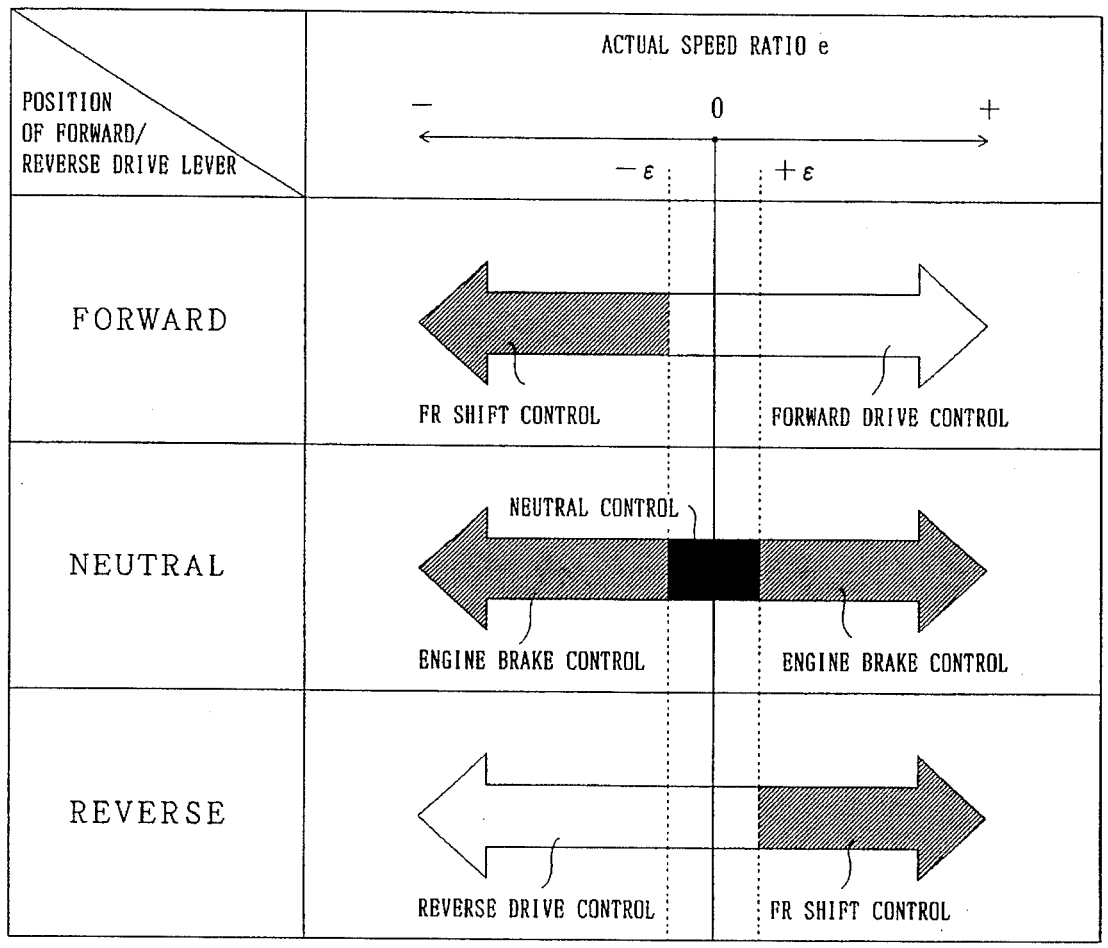

In this embodiment, how the vehicle should be controlled is accordingly judged from the position of the change lever (i.e., the foward/reverse drive lever) and the actual speed ratio e, and the vehicle is controlled to start or stop based on the judgment. Referring to FIG. 5 which concretely illustrates the judgment, when the forward/reverse drive lever is in the forward drive (F) position and the actual speed ratio e is more than a specified small value −ϵ (ϵ is for example the speed ratio when vehicle speed is 0.04 km/h and the engine is in its full-throttle state), it is determined that the vehicle is in the forward drive control state. When the forward/reverse drive lever is in the forward drive (F) position with the actual speed ratio e being equal to −ϵ or less, it is determined that the vehicle is in the FR shift control state. When the forward/reverse drive lever is in the neutral (N) position and the actual speed ratio e is less than −ϵ or more than $+\epsilon$, it is determined that the vehicle is in the engine brake control state. When the forward/reverse drive lever is in the neutral (N) position with the: actual speed ratio e being between $-\epsilon$ and $+\epsilon$, it is determined that the vehicle is in the neutral control state. When the forward/reverse drive lever is in the reverse drive (R) position and the actual speed ratio e is less than $+\epsilon$, it is determined that the vehicle is in the reverse drive control state. When the forward/reverse drive lever is in the reverse drive (R) position and the actual speed ratio e is equal to $+\epsilon$ or more, it is determined the vehicle is in the FR shift control state.

Figure 6:
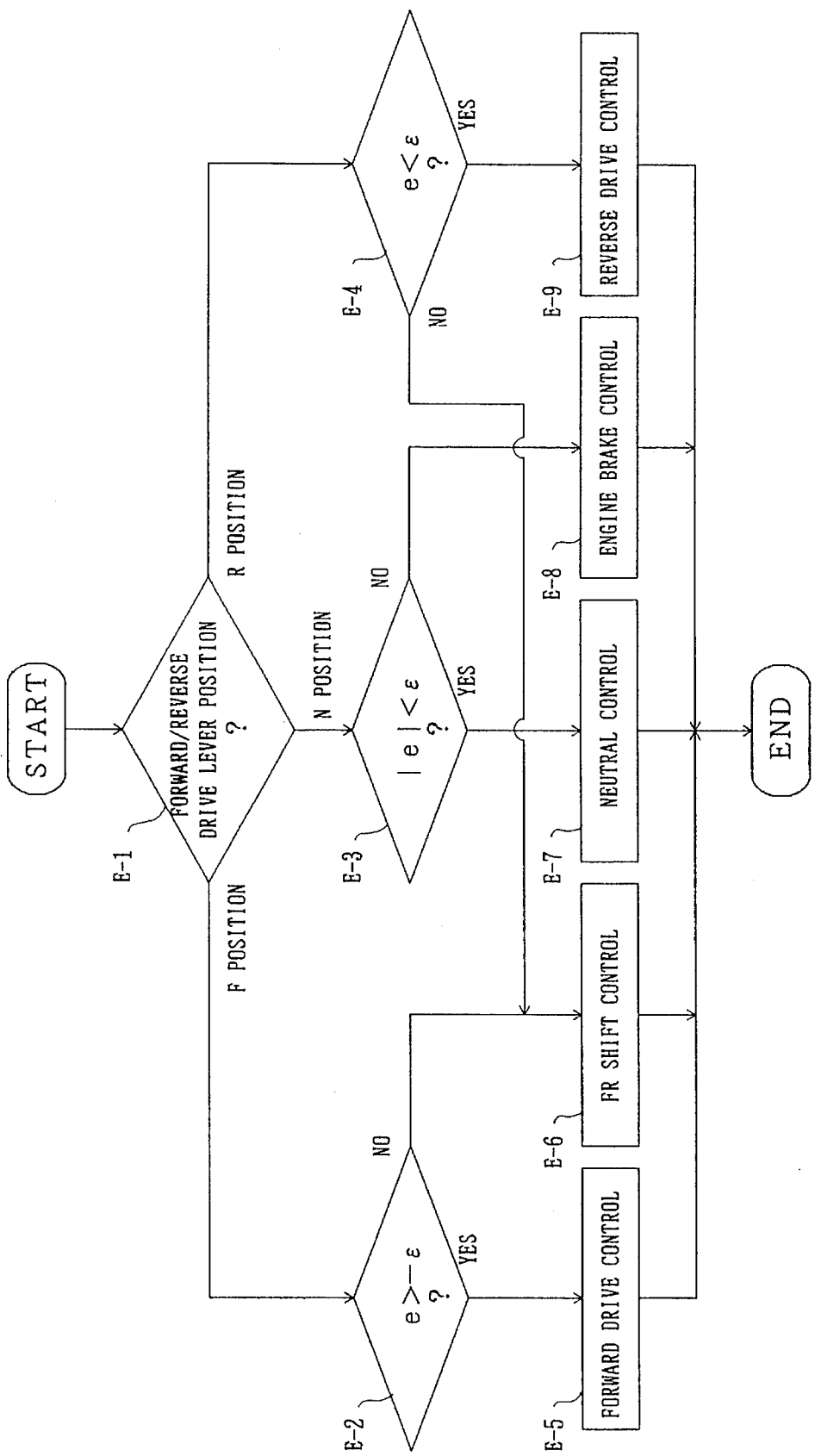

FIG. 6 shows the control flow of the vehicle control judgment illustrated in FIG. 5. This control flow will be described below.

E-1: Judgment is made to check which of the positions F, N and R the forward/reverse drive lever is placed in.

E-2 to E-9: If the forward/reverse drive lever is in the F position, the vehicle is in the forward drive control state on condition that the actual speed ratio e is more than $-\epsilon$ (e>$-\epsilon$) and is in the FR shift control state on condition that the actual speed ratio e is equal to $-\epsilon$ or less (e$\leq -\epsilon$). If the forward/reverse drive lever is in the N position, the vehicle is in the neutral control state on condition that the absolute value of the actual speed ratio e is less than $\epsilon$ (|e|<$\epsilon$) and is in the engine brake control state on condition that the absolute value of the actual speed ratio e is equal to $\epsilon$ or more (|e|$\geq \epsilon$). If the forward/reverse drive lever is in the R position, the vehicle is in the reverse drive control state on condition that the actual speed ratio e is less than $\epsilon$ (e<$\epsilon$) and is in the FR shift control state on condition that the actual speed ratio e is equal to $\epsilon$ or more (e$\geq \epsilon$).

Figure 7:
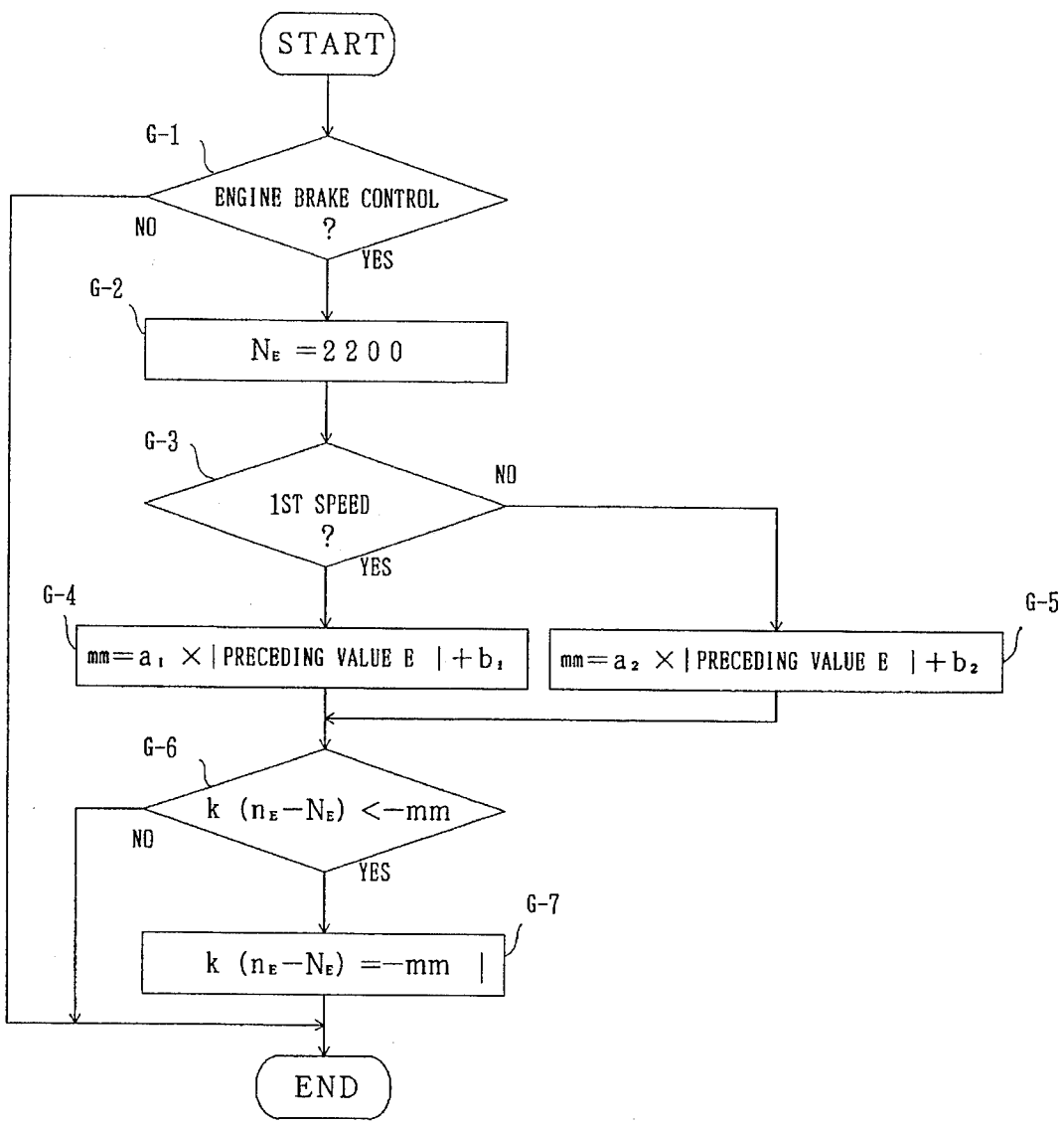
Figure 8:
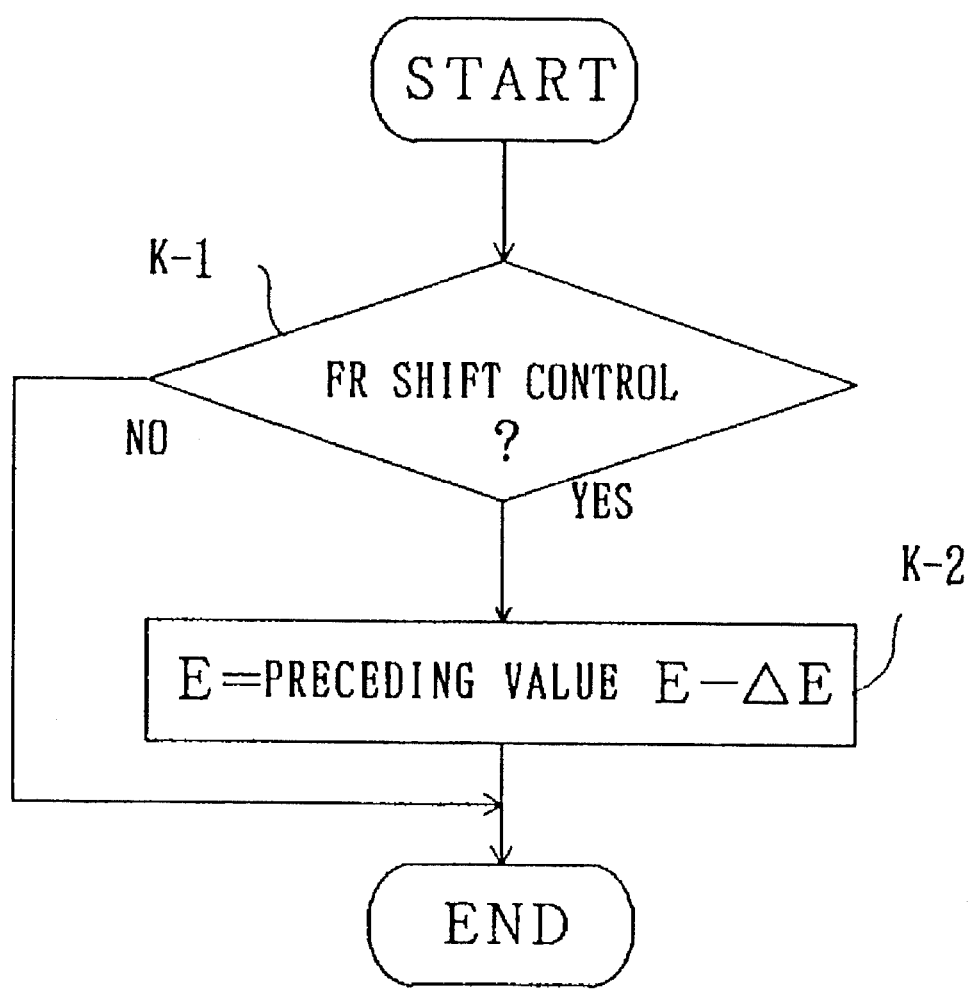
Figure 9:
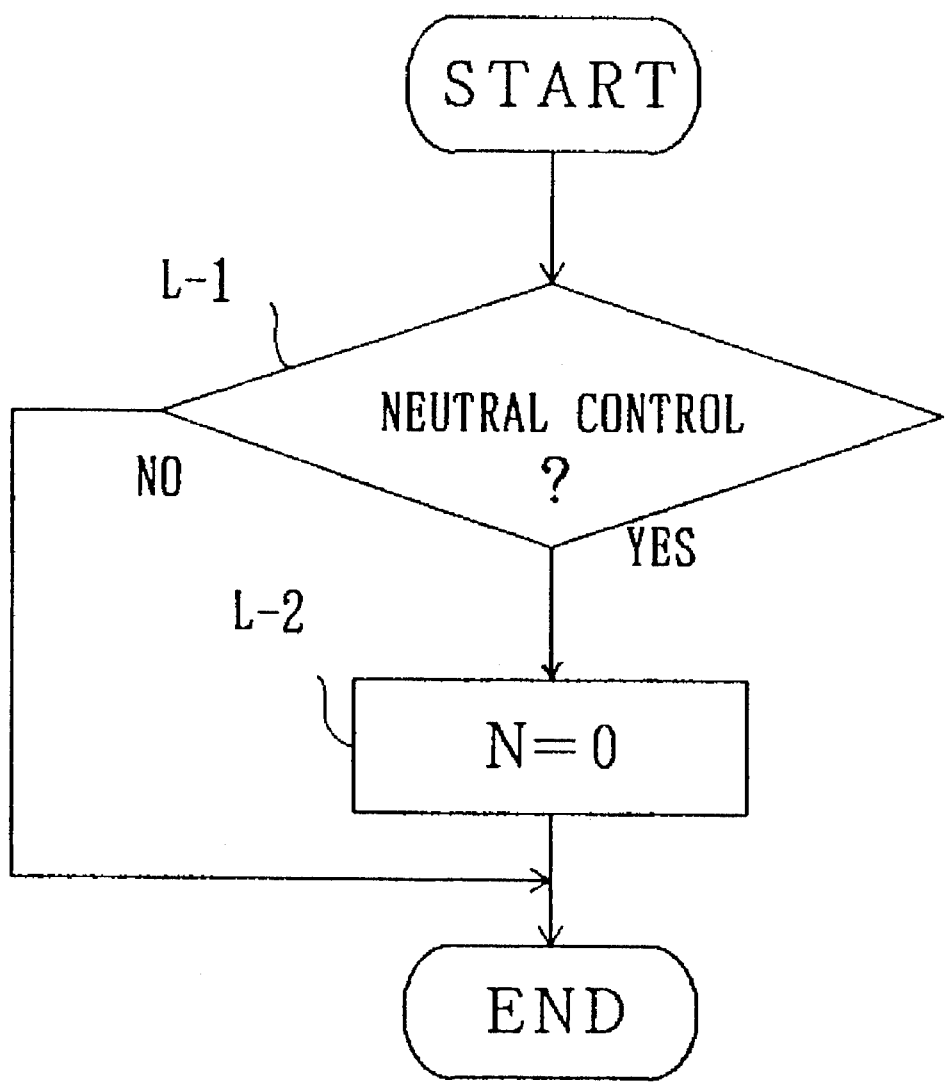

Reference is now made to FIGS. 7, 8 and 9 for describing the engine brake control routine (Step G), FR shift control routine (Step K) and neutral control routine (Step L).

(a) Engine brake control (FIG. 7)

G-1 to G-2: If the vehicle is in the engine brake control state, the, target engine revolution speed $N_E$ is fixed at a value (e.g., 2,200 rpm) which is not less than the revolution speed (2,100 rpm) of the engine when it is in a full-throttle state. With $N_E$ fixed at 2,200 rpm, the value of $k(n_E-N_E)$ in the equation (1) which is used to calculate the target speed ratio E always becomes minus, so that the value of the target speed ratio E gradually decreases, decelerating the vehicle.

G-3 to G-5: To change the degree of limitation for deceleration according to the present speed range, judgment is made to check which of the speed ranges (1st speed, 2nd speed and 3rd speed) the transmission is placed in. If it is determined that the transmission is in 1st speed, a value mm is calculated by the following equation.

$$mm = a_1 \times |\text{preceding value E}| + b_1$$

On the other hand, if the transmission is in 2nd speed or 3rd speed, the value mm is obtained from the following equation.

$$mm = a_2 \times |\text{preceding value E}| + b_2$$

In these equations, $a_1$, $b_1$, $a_2$ and $b_2$ are all constants and the preceding value E is the preceding value of the target speed ratio E.

G-6 to G-7: The value of $k(n_E-N_E)$ is compared to $-mm$ and if $k(n_E-N_E) < -mm$, $k(n_E-N_E)$ is set to $-mm$ (i.e., $k(n_E-N_E) = -mm$). If $k(n_E-N_E) \geq -mm$, the flow is terminated since there is no need to limit vehicle deceleration.

If the vehicle is not in the engine brake control state, the flow is terminated without proceeding to Step G-2 onwards.

Vehicle deceleration determined by the value of $k(n_E-N_E)$ is thus limited, so that the vehicle can be smoothly stopped without being subjected to abrupt deceleration.

(b) FR shift control (FIG. 8)

In this control, the value of the target speed ratio E is forcibly made small irrespective of the equation (1) (E=e+$k(n_E-N_E)$). However, if E is set to 0 in one step, vehicle deceleration cannot be controlled and therefore the target speed ratio E is reduced stepwise using the following equation.

$$E = \text{preceding value } E - \Delta E$$

As understood from the flow chart of FIG. 8, judgment is first made to check whether the vehicle is in the FR shift control state (K-1). If the vehicle is in the FR shift control state, E is obtained from the above equation E=preceding value E-$\Delta E$ (K-2). To adjust deceleration, the value of $\Delta E$ is appropriately set in this calculation. For example, if rapid deceleration is required, 66 E is set to a large value.

(c) Neutral control (FIG. 9)

In this control, judgment is first made to check whether the vehicle is in the neutral control state (L-1). If the vehicle is in the neutral control state, the target speed ratio E is then fixed at zero (L-2). This permits the vehicle to stop without fail.

Next, the E-value limitation routine for each speed range (Step M) will be described in detail.

Figure 10:
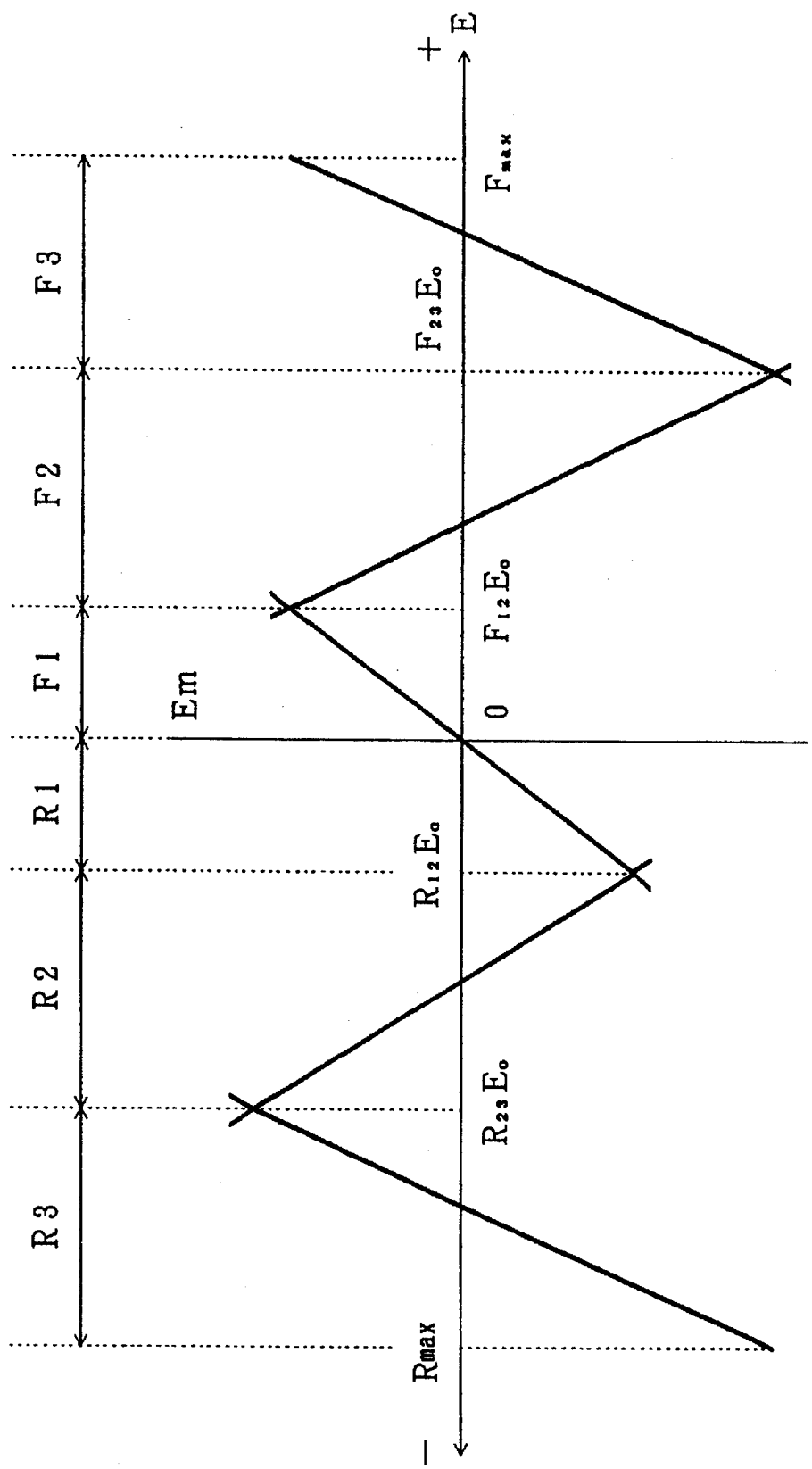
Figure 11A:
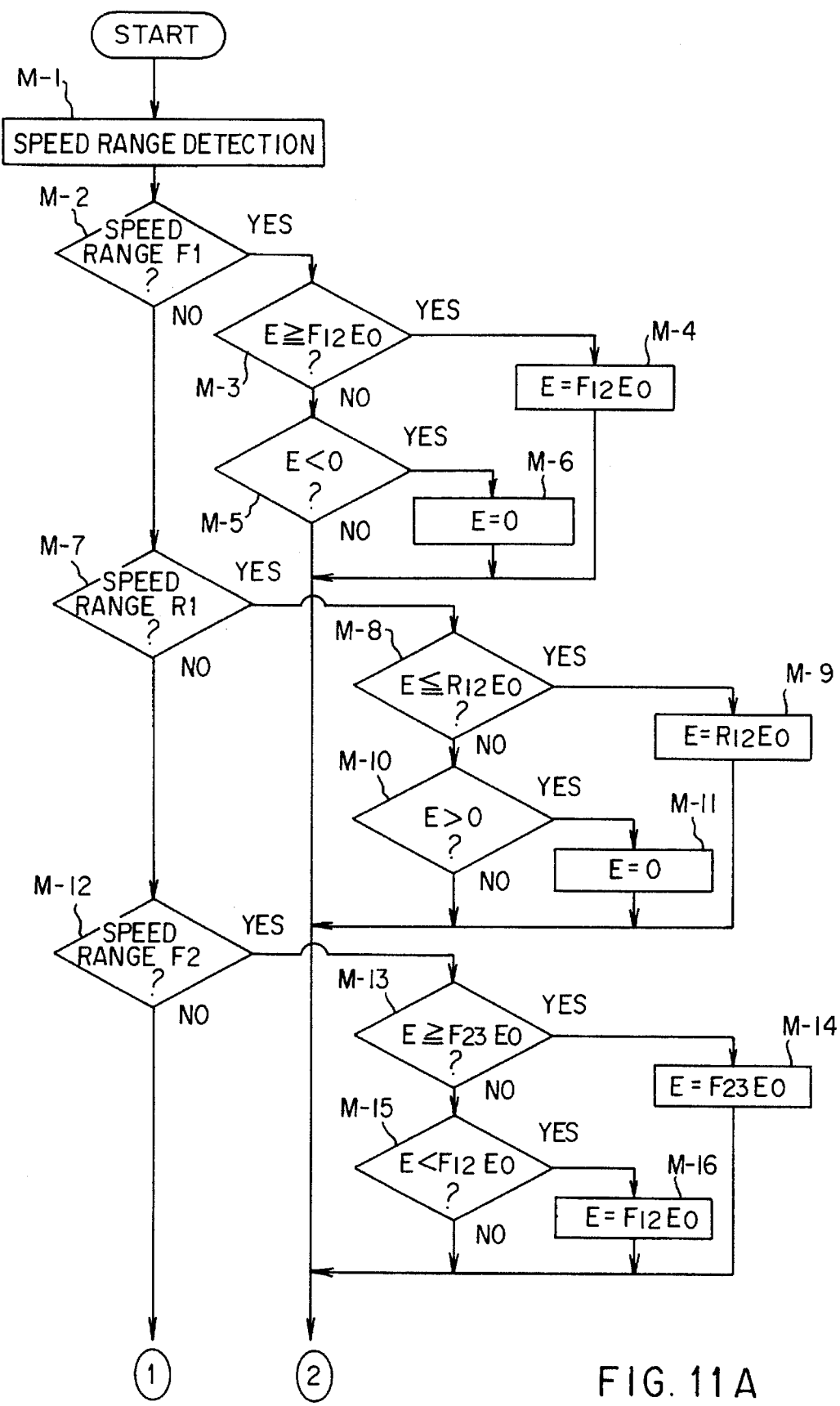
Figure 11B:
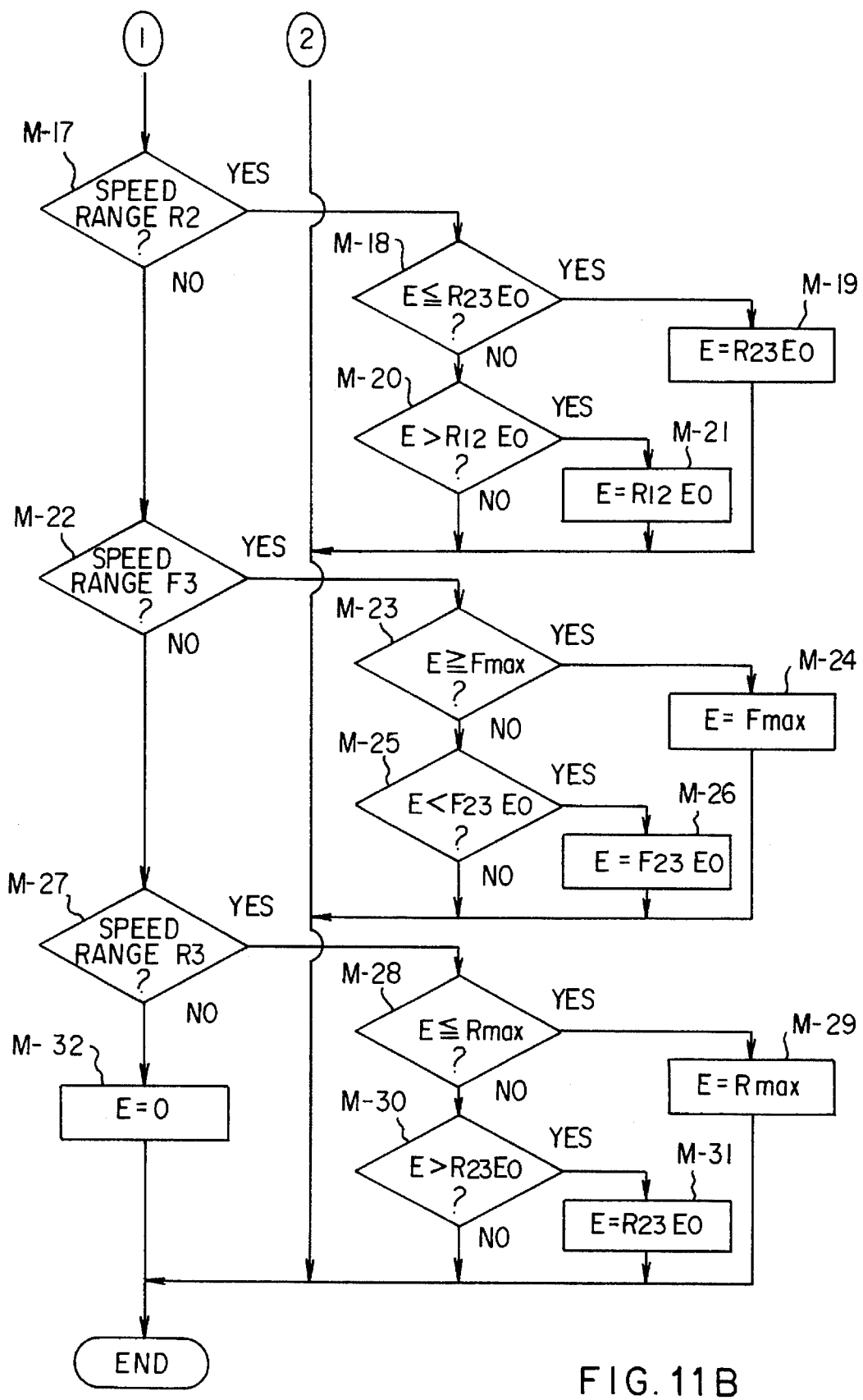

Since the target motor speed ratio $E_m$ is calculated (see Step N in the flow chart of FIG. 4) based on the target speed ratio E whose range varies depending on speed ranges as shown in FIG. 10, the range of the value E has to be specified for each speed range by this routine. Reference will now be made to the flow chart of FIG. 11 for explaining the E-value limitation routine.

M-1: The speed range in which the transmission is presently placed is detected.

M-2 to M-6: If the transmission is placed in 1st forward speed (F1), judgment is made to check whether or not the target speed ratio E is $E \geq F_{12}E_0$. If $E \geq F_{12}E_0$, E is then set to $F_{12}E_0$, and if $E < F_{12}E_0$, it is then determined whether the target speed ratio is $E \geq 0$. If E<0, E is set to 0 and then, the flow is completed. If $E \geq 0$, the flow is immediately completed.

M-7 to M-11: If the transmission is placed in 1st reverse speed (R1), it is then determined whether or not the target speed ratio is $E \leq R_{12}E_0$. If $E \leq R_{12}E_0$, E is set to $R_{12}E_0$, and if $E > R_{12}E_0$, it is then determined whether the target speed ratio is E>0. If E>0, E is set to 0 and then, the flow is completed. If E<0, the flow is immediately completed.

M-12 to M-16: If the transmission is placed in 2nd forward speed (F2), it is then determined whether or not the target speed ratio is $E \geq F_{23}E_0$. If $E \geq F_{23}E_0$, E is set to $F_{23}E_0$, and if $E < F_{23}E_0$, it is then determined whether the target speed ratio is $E < F_{12}E_0$. If $E < F_{12}E_0$, E is set to $F_{12}E_0$ and then, the flow is completed. If $E \geq F_{12}E_0$, the flow is immediately completed.

M-17 to M-21: If the transmission is placed in 2nd reverse speed (R2), it is determined whether or not the target speed ratio is $E \leq R_{23}E_0$. If $E \leq R_{23}E_0$, E is set to $R_{23}E_0$, and if $E > R_{23}E_0$, it is then determined whether the target speed ratio is $E > R_{23}E_0$. If $E > R_{12}E_0$, E is set to $R_1E_0$ and then, the flow is completed. If $E \leq R_{12}E_0$, the flow is immediately completed.

M-22 to M-26: If the transmission is placed in 3rd forward speed (F3), it is determined whether or not the target speed ratio is $E \geq F_{max}$. If $E \geq F_{max}$, E is then set to $F_{max}$, and if $E < F_{max}$, it is then determined whether the target speed ratio is $E < F_{23}E_0$. If $E < F_{23}E_0$, E is set to $F_{23}E_0$ and then, the flow is completed. If $E \geq F_{23}E_0$, the flow is immediately completed.

M-27 to M-31: If the transmission is placed in 3rd reverse speed (R3), it is determined whether or not the target speed ratio is $E<R_{max}$. If $E \leq R_{max}$, E is then set to $R_{max}$, and if $E>R_{max}$, it is then determined whether the target speed ratio is $E>R_{23}E_0$. If $E>R_{23}E_0$, E is set to $R_{23}E_0$ and then, the flow is completed. If $E \leq R_{23}E_0$, the flow is immediately completed.

M-32: If the transmission is not placed in any of $F_1$, $R_1$, $F_2$, $R_2$, $F_3$ and $R_3$, the target speed ratio E is set to 0 and then the flow is completed.

While the equation (1) is used for obtaining the target speed ratio E in the foregoing embodiment, the following equation may be used.

$$E = e \times (n_E/N_E)$$

Alternatively, the preceding value E' of the target speed ratio may be substituted in the following equation.

$$E = E' + k(n_E - N_E)$$

The following equation may be also used.

$$E = E' \times (n_E/N_E)$$

In this case, there is no need to obtain the actual speed ratio e in order to obtain the target speed ratio E.

Although the actual motor speed ratio $e_m$ is obtained directly from the ratio of the revolution speed of the motor to the revolution speed of the engine, it may be obtained in other ways. For example, the revolution speed of the input shaft 23 and that of the output shaft 26 are detected taking the reduction ratio of the engine 21 etc. into account, and the actual motor speed ratio $e_m$ is obtained from the ratio of the revolution speed of the output shaft 26 to the revolution speed of the input shaft 23. Another alternative is such that the revolution speed of the input shaft 23 and that of the output shaft 54 of the variable displacement motor 53 are detected and the actual motor speed ratio $e_m$ is obtained from the ratio of the revolution speed of the motor 53 to the revolution speed of the input shaft 23. In these case, the target revolution speed of the input shaft 23 for the throttle position X may be obtained from a throttle position signal from the throttle position detector 72, and the target motor speed ratio $E_m$ may be obtained through the arithmetic operation in which the target speed ratio of the revolution speed of the output shaft 26 to the revolution speed of the input shaft 23 is obtained by converting the actual motor speed ratio $e_m$ into the speed ratio of the revolution speed of the input shaft 23 to the revolution speed of the output shaft 26. In addition, the actual motor speed ratio may be obtained from the ratio of the revolution speed of the output shaft 26 to the revolution speed of the engine 21 or from the ratio of the revolution speed of the motor 53 to the revolution speed of the output shaft 26, taking the reduction ratio of the engine 21 etc. into account.

In the foregoing embodiment, the angle of the discharge controlling variable-angle swash plate 50a for the variable displacement pump 50 and that of the discharge controlling variable-angle swash plate 53a for the variable displacement motor 53 are controlled in accordance with the operation amount A by means of the angle changing valves 76, 77 respectively. However, the angle of either of the discharge controlling variable-angle swash plates 50a and 53a may be controlled.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A forward/reverse drive and stop control system for a hydrostatic-mechanical transmission which is equipped with a mechanical transmission unit actuated through an input shaft connectable to a power source; a hydrostatic transmission unit which is connectable to the input shaft and comprises a pump and motor having their respective discharge controlling swash plates, the angle of at least either of the swash plates being variable; and a differential unit for actuating both the mechanical transmission unit and the hydrostatic transmission unit by connecting an output shaft thereto, the control system comprising:
  (a) speed ratio detecting means for detecting an actual speed ratio that is the ratio of the revolution speed of said output shaft to the revolution speed of said power source;
  (b) lever position detecting means for determining which of forward drive position, neutral position and reverse drive position a forward/reverse drive lever is placed in; and
  (c) vehicle control state judging means for making a judgment based on the detections performed by the speed ratio detecting means and the lever position detecting means, such that (i) a vehicle is in a forward drive control state in which the vehicle is required to be forwardly driven, on condition that the forward/reverse drive lever is placed in the forward drive position and the actual speed ratio exceeds a specified small value in a forward drive direction, (ii) the vehicle is in a reverse drive control state in which the vehicle is required to be reversely driven, on condition that the forward/reverse drive lever is placed in the reverse drive position and the actual speed ratio exceeds a specified small value in a reverse drive direction, (iii) the vehicle is in an engine brake control state in which the vehicle is required to be gradually stopped, on condition that the forward/reverse drive lever is placed in the neutral position and the actual speed ratio exceeds the specified small value in the forward drive direction or the specified small value in the reverse drive direction, (iv) the vehicle is in an FR shift control state in which the vehicle is required to be once immediately stopped and then driven in an opposite direction, on condition that the forward/reverse drive lever is placed in the forward drive position or reverse drive position and the actual speed ratio exceeds the specified small value in the reverse drive direction or the specified small value in the forward drive direction, and (v) the vehicle is in a neutral control state in which the vehicle is required to be completely stopped, on condition that the forward/reverse drive lever is placed in the neutral position and the actual speed ratio does not exceed the specified small values in the forward drive direction and reverse drive direction.

2. The forward/reverse drive and stop control system for a hydrostatic-mechanical transmission as claimed in claim 1, further comprising:
  (a) target speed ratio computing means for computing a target speed ratio, which is a target value for the ratio of the revolution speed of the output shaft to the revolution speed of the power source, according to the control state of the vehicle judged by the vehicle control state judging means;

(b) target motor speed ratio computing means for computing a target motor speed ratio, which is a target value for the ratio of the revolution speed of the motor in the hydrostatic transmission unit to the revolution speed of the power source, from the target speed ratio computed by the target speed ratio computing means; and (c) swash plate angle controlling means for controlling the angle of at least either of the discharge controlling swash plates according to the target motor speed ratio computed by the target motor speed ratio computing means.

3. The forward/reverse drive and stop control system for a hydrostatic-mechanical transmission as claimed in claim 2, wherein the target speed ratio computing means computes the target speed ratio with a target engine revolution speed fixed at a value more than the revolution speed of an engine in a full-throttle state, when the vehicle control state judging means judges that the vehicle is in the engine brake control state.

4. The forward/reverse drive and stop control system for a hydrostatic-mechanical transmission as claimed in claim 3, wherein the target speed ratio computing means computes the target speed ratio, limiting the difference between the actual revolution speed of the engine and a target revolution speed for the engine according to a speed range in which the mechanical transmission unit is presently placed.

5. The forward/reverse drive and stop control system for a hydrostatic-mechanical transmission as claimed in claim 2, wherein the target speed ratio computing means computes the target speed ratio such that it decreases a certain value at a time, when the vehicle control state judging means judges that the vehicle is in the FR shift control state.

6. The forward/reverse drive and stop control system for a hydrostatic-mechanical transmission as claimed in claim 2, wherein the target speed ratio computing means fixes the target speed ratio at zero, when the vehicle control state judging means judges that the vehicle is in the neutral control state.

7. The forward/reverse drive and stop control system for a hydrostatic-mechanical transmission as claimed in any one of claims 2 to 6, wherein the target speed ratio computed by the target speed ratio computing means is limited within a specified range which is set for every speed range for the mechanical transmission unit, using the characteristic function of the target motor speed ratio against the target speed ratio.

* * * * *

UNITED STATES PATENT AND TRADEMARK OFFICE
CERTIFICATE OF CORRECTION

PATENT NO. : 5,529,546
DATED : June 25, 1996
INVENTOR(S) : Tsutomu ISHINO et al

It is certified that error appears in the above-indentified patent and that said Letters Patent is hereby corrected as shown below:

Title page, [73] Assignee, delete "Kabushkik" and insert therefor --Kabushiki--.

Signed and Sealed this

Twelfth Day of November, 1996

Attest:

BRUCE LEHMAN

*Attesting Officer*     *Commissioner of Patents and Trademarks*